US012393710B2

(12) United States Patent
Jacik

(10) Patent No.: US 12,393,710 B2
(45) Date of Patent: Aug. 19, 2025

(54) RECORD REGISTRATION SYSTEM AND METHOD

(71) Applicant: Brillient Corporation, Reston, VA (US)

(72) Inventor: Richard Jacik, Lansdowne, VA (US)

(73) Assignee: Brillient Corporation, Reston, VA (US)

( * ) Notice: Subject to any disclaimer, the term of this patent is extended or adjusted under 35 U.S.C. 154(b) by 218 days.

(21) Appl. No.: 17/978,704

(22) Filed: Nov. 1, 2022

(65) Prior Publication Data

US 2023/0139219 A1     May 4, 2023

Related U.S. Application Data

(60) Provisional application No. 63/274,277, filed on Nov. 1, 2021.

(51) Int. Cl.
*G06F 21/62*     (2013.01)

(52) U.S. Cl.
CPC .................. *G06F 21/6218* (2013.01)

(58) Field of Classification Search
CPC .................................................. G06F 21/6218
See application file for complete search history.

*Primary Examiner* — Ryan J Jakovac

(74) *Attorney, Agent, or Firm* — HEA Law PLLC; Darrin A. Auito

(57) ABSTRACT

A universal record registry system is described that includes a central processing unit configured to register an external application comprising partner information and a document policy, wherein the document policy comprises configurations for record creation, modification, and metadata; obtain a notice of record creation or modification from the external application wherein the record comprises record information; confirm the authenticity of the notice by comparing the partner information to information in the notice; confirm the record information is consistent with the document policy information; generate a unique transaction identifier for the record; validate that the metadata associated with the notice is consistent with the policy information; enrich the metadata if the metadata is not consistent with the policy information; and create a universally unique record identifier for the record. The universal record registry system creates the universally unique record identifier regardless of a record file type.

20 Claims, 11 Drawing Sheets

Minimum Transaction Set and Usage

| RRA Records Event Transaction | Usage | Partner Application | RRA Response |
|---|---|---|---|
| IntentToCreate | Initial notification and reservation for long-running record-instantiation transaction | Supporting metadata, record type, policy mapping overrides, expected instantiation date | "pre-birth" certificate of instantiated record, Universally Unique Record Identifier (UURI), state information, expiration date, unique transaction identifier |
| Create | Instantiation of a record already recorded via IntentToCreate transaction or instantiation of a new record | Supporting metadata, record type, policy mapping overrides, IntentToCreate transaction identifier and certificate (if appropriate) | universally unique record identifier (UURI), certificate of instantiation (birth certificate), state information, policy mapping, unique transaction identifier |
| Modify (update, combine, spawn) | 2-phase updates to required/key metadata elements or policy mappings; records being combined, records generated due to processing associated with an existing record (versions, etc.) | Phase I. Affected universally unique record identifier(s) and transaction subtype (update, combine, spawn), supporting transaction data. Phase II. Validation Token identifier. | Phase I. "Validation Token" with an expiration time/date for completing transaction. Phase II. Unique Transaction Identifiers, state changes, and new universally unique identifiers (as appropriate) |
| Record Hold (On, Off) | Prevent record disposition changes and modifications to support FOIA, e-discovery, OIG investigations, etc. | UURIs, Hold Transaction Type (On or Off), Hold Reason/Type | Unique transaction identifier, Hold state change, Hold certificate |
| IntentToDisposition | Initial notification and reservation for long-running disposition transactions | Supporting metadata, record type, policy mapping overrides, expected instantiation date | "pre-death" certificate of instantiated record, state information, expiration date, unique transaction identifier |
| Disposition | Disposition of a record already recorded via IntentToDisposition Transaction. | IntentToDisposition transaction identifier, disposition data. | Unique transaction identifier, state change, "death certificate" |

FIG. 8

RECORD REGISTRATION SYSTEM AND METHOD

TECHNICAL FIELD

Providing a registry for managing the lifecycle of records (e.g., emails, HR, financials, social media, etc.), from instantiation through final disposition.

BACKGROUND

The managing, tracking, and storing of information is of concern across the public and private sectors, particularly heavily regulated industries.

For example, U.S. Federal and State laws, as well as agency policy, require that information artifacts and data gathered and generated by agencies of the government in the completion of their work be managed, tracked, and stored in compliance with statutes and be available for purposes of public benefit, public inspection, Freedom of Information Act (FOIA) requests, and evidence discovery purposes related to outside litigation or congressional or jurisdictional oversight. Compliance with these rules is often difficult because of the heterogenous nature of the data (artifacts) and the wide variety of information technology (IT) systems creating, managing, modifying, and storing items that should be treated, stored, and archived/purged based on government policy and law; and which should be findable across IT systems, and across agencies for purposes of FOIA, litigation, and investigation.

The statutory definition of "records" (44 USC 3301) "(A) includes all recorded information (e.g., all traditional forms of records, regardless of physical form or characteristics, including information created, manipulated, communicated, or stored in digital or electronic form) regardless of form or characteristics, made or received by a Federal agency under Federal law or in connection with the transaction of public business and preserved or appropriate for preservation by that agency or its legitimate successor as evidence of the organization, functions, policies, decisions, procedures, operations, or other activities of the United States Government or because of the informational value of data in them; and (B) does not include—(i) library and museum material made or acquired and preserved solely for reference or exhibition purposes; or (ii) duplicate copies of records preserved only for convenience." The definition applies to all Departmental records including those created, received, and maintained by all contractors pursuant to their contracts.

It is currently not known what the actual universe of government records is given that records are stored and managed by discrete systems and software applications and the difficulty in tracking records that are made up of components stored in multiple places (e.g., meeting recordings in a teleconferencing system, decision notes in a document collaboration system, meeting materials distributed via email). When an untoward (e.g., unexpected and inappropriate or inconvenient) event occurs (e.g., Theft, System Failure, Accidental Deletion, Bad Faith Deletion, etc.) it is often not discernable as to the body of records impacted by the untoward event or what the general nature of those now-missing records were.

Plus, it is currently impossible to know, based on standard FOIA processes and technology-based searches, if all relevant records have been found with respect to a given search criteria because there is no central list, and no centralized or decentralized history, of all records created, modified, saved, archived, or destroyed, even among individual IT systems that are records-aware.

SUMMARY

The present disclosure describes the design and implementation of a Records Registry Service (RRS) that is National Archives and Records Administration (NARA) compliant, tracks the longitudinal scope of data, artifacts, or information that meet the existing definition of government "records" and enables external IT systems to document the longitudinal lifecycle of the creation, modification, official storage place, and disposition (deletion/deletion as of date or permanent archival) of each record.

The RRS creates a universally unique record identifier (UURI) and stores key mandatory metadata about the record as described by the external system. The external application can store the generated unique identifier, or it can provide its own unique key for subsequent registry entry searches and updates.

The RRS creates a persistent entry which is maintained forever, and which describes the lifecycle of a record, including key search metadata elements.

The RRS provides a logical pointer back to the agency owner and IT system that owns or maintains that records, or to the archival system, or a logical response that the record is no longer available.

For records that fit a defined retention plan based on an object identifier (OID), for example, the RRS can notify the owning system of key milestones including the readiness of certain records to be purged/destroyed or archived based on business rules tied to the object identifier and record retention plan/schedule.

The RRS provides support for continuous organizing and indexing stored record identifiers and metadata such that they are search engine accessible and may be queried or extracted as datasets such that related records can be probabilistically and automatically linked without need for human adjudication.

Thus, the present system can be utilized to overcome technical problems in the art of digitizing, collecting, organizing, and searching for documents and information across multiple different platforms, file types, and companies/government agencies.

BRIEF DESCRIPTION OF DRAWINGS

The present system is illustrated by way of example and not limited in the figures of the accompanying drawings in which like references indicate similar elements.

FIG. 8 depicts a table including the types of record change, the usage thereof, the related activity by the Partner Application, and the system response.

DETAILED DESCRIPTION

Figure 1:
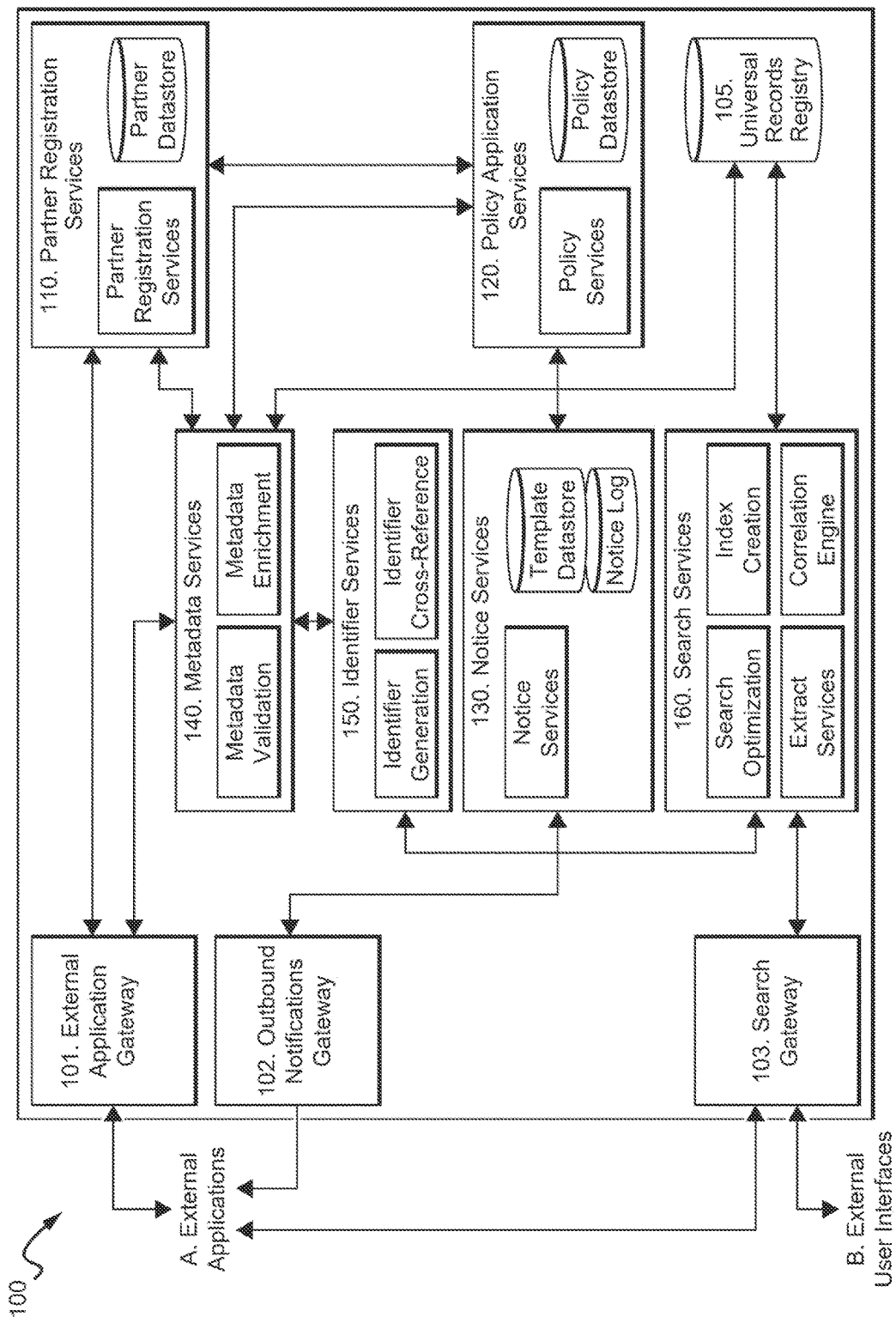
FIG. 1 illustrates a system-level diagram of the present system, according to one embodiment.

All identically numbered reference characters correspond to each other so that a duplicative description of each reference character in the drawings may be omitted.

FIG. 1 illustrates a system-level embodiment of the present system, including the following features, functionality, and/or components.

Records Registry Service (RRS) 100 is comprised of complimentary services that interact to provide records registry functionality to partner (consuming) systems and consuming user interfaces. The functionality is abstracted with a set of public services that provide an external interface to the system 100. Features of the system 100 include, for example (described below): External Application Gateway 101; Outbound Notification Gateway 102; Search Gateway 103; Universal Records Registry (URR) 105; Partner Registration Services 110; Policy Application Services 120; Notice Services 130; Metadata Services 140; Identifier Services 150; and Search Services 160.

As shown in FIG. 1, including the links between the different components, the communication and interaction between the various components are flexible. While exemplary interactions are discussed below, it would be understood by a person of skill in the art that the exemplary functionality and interactions described below may be modified depending on the system such that different components include different functionality and/or different components may interact with each other as needed.

External Application Gateway 101 may be configured to provide standards-based system-to-system interaction protocols for partner systems. Application Programming Interfaces (API) meeting general technical standards like Simple Object Access Protocol (SOAP) and Representational State Transfer (REST) and may include more traditional protocols like Distributed Component Object Model (DCOM) and Remote Procedure Call (RPC) as well as future technical protocols. The External Application Gateway 101 may also be configured to provide technical coordination and orchestration of Records Registry Service (RRS) APIs that are "public" (e.g., exposed to other applications). Functionality hosted through the External Application Gateway 101 may also include optional new partner application registration, optional policy updates, new record registration requests, existing record retrieval of registry entries, modifications to record registrations (including metadata), and record disposition updates. Unique transaction identifiers along with status return codes are supplied for each API action that modifies data in the Universal Records Registry 105.

An External Application A is any of a set of search utilities, business applications, or analytics applications using publicly available search and query API services. External Applications A do not need to authenticate to the RRS 100. External Applications A can use the Partner Registration Services 110 to request promotion to Partner Application status.

A Partner Application is any of a set of business applications that have access to additional services after the application has been authorized as a Partner Application (one time) and authenticated (each new access). Partner Applications, for example, take advantage of all other RRS 1M public services, including notifications, advanced searches, policy services, and records registration (certification) and records event services, e.g., FIG. 2.

Outbound Notifications Gateway 102 may be configured to provide standards-based notifications to Partner Applications for record policy notification events that are identified within the RRS 100. Such notifications may be optional and are available to Partner Applications participating in the Policy Application Services 120 (described below) functionality. Record policy notifications include, for example, notices of registry objects owned by the Partner Application that are about to meet NARA, institutional, or organizational policy determinations as determined for that record type and partner application by Policy Application Services 120. Messages may be delivered using synchronous calling protocols (SOAP, REST, etc.) or may be queued for asynchronous delivery. The objective is that the notification triggers action by Partner Applications to take appropriate, compliant action on records they manage.

The Search Gateway 103 may be configured to provide standards-based interaction for external search user interfaces and external search engines using, for example, HTTPS protocols to receive and process search requests. The Search Gateway 103 may provide singleton results or result sets as appropriate, and supports extraction of result sets using industry standard file formats (e.g., CSV).

Universal Records Registry 105 is a persistent, mechanism-neutral, datastore for record registration events, certification logging, recording metadata (mandatory and optional), Universally Unique Record Identifiers (UURIs), storing universally unique record transaction codes, and storing logical pointers to the owning system of record. It may be implemented in a relational database, object database, no-SQL database, or other file or block-based storage mechanism. Each of the records in the Universal Records Registry 105 contain the record's UURI as well as the system of record's internal ID (if provided). The Universal Records Registry 105 records transaction support including, for example, (i) Creation (Birth) wherein a UURI and Creation Certificate ID are returned to the partner system, (ii) Modification (combine, separate, spawn, update) wherein new UURIs and certificate IDs are created as needed and Modification certificate is created, (iii) Disposition-Archive (Unique Certificate of Archival is created), (iv) Disposition-Purge (Certificate of Purge is created). And (v) Disposition-Accession (Certificate of NARA accessioning is created).

Partner Registration Services 110 are optional server to server registration services for external applications A that will integrate with the Records Registry Application 100 and serves to allow those external applications A to take advantage of Policy Application Services 120 and Notice Services

130. Applications that do not register through the Partner Registration Services 110 may still utilize a limited number of other Records Registry Services. The Partner Registration Services 110 manage a persistent datastore (the Partner Datastore), for example, that holds Partner Application information, owning organization information, key contact information at the organization, and preferences in a relational, no-SQL, or other file or block-based storage mechanism. Key services include, for example, registering a new application (returns a unique application ID), updating organizational record retention/management policy, and customizing preference for notice services.

The Policy Application Services 120 support records retention policy creation and maintenance as they are to be applied for Notice Service 130 for each External Application and record object type. Policy application defaults will apply to each newly registered record and any time records registration states are modified. All default policies can be overridden on individual record registration transactions. Policy Application Services 120 manage a persistent datastore (the Policy Datastore) that holds policy information including policy definition and preferences in a relational, no-SQL, or other file or block-based storage mechanism.

The Notice Services 130 provide notice(s) to subscribed Partner Applications that are consumers of Records Registry Application 100 services and have configured retention policies by record type as part of the Policy Application Services 120. The Notice Services 130 identifies record registrations where policy dictates some state change based on the passage of time or other factor. It creates a notification record in a format governed by templates and rules stored in a Template Datastore and submits it to the Partner Application via Outbound Notifications Gateway 102 for each effected record, in advance of, and on the date of the proscribed event. The Notice Services 130 may include a template datastore standardizing notice formats depending on the type of notification being generated. All notices are maintained forever in an electronic log that holds a copy of the outbound notification in a relational, no-SQL, or other file or block-based storage mechanism.

Metadata Services 140 ensure metadata provided by the Partner Applications is complete and sufficient to support the requested record transaction. Functionality is provided by two private services components: Metadata Validation and Metadata Enrichment.

The Metadata Validation provides, for example, business rule (e.g., restricting generation dates, requiring content for certain fields, or redaction indicators) and technical edits to ensure that metadata provided by the Partner Application is (i) present, complete, type consistent, and within bounds, for required metadata data elements, and that (ii) optional metadata elements, if present are type consistent, complete, and pass template edits. Mandatory metadata elements are comprised of, for example, mandatory source system data, a record's UURI (unless this is a "Create" transaction), NARA minimum metadata, and other items configured as mandatory data elements.

Metadata Enrichment provides, for example, business rule and technical creation of additional metadata fields that are system maintained or defined by custom business rule definition with a Partner Application. Enrichment, for example, may be driven by machine learning and classification algorithms and/or by declared predicate logic.

Identifier Services 150 provides functionality around uniquely identifying records that have been registered in the application, uniquely identifying transactions/events that those records have participated in, and in mapping UURIs to system of record internal record identifiers. They include, for example, Identifier Generation and Identifier Cross-Reference.

The Identifier Generation, for example, creates UURIs for new records, validates UURIs supplied by Partner applications for Record Events and creates unique transaction IDs for certificate-generating events (e.g., Creation/Birth, Purge/Death, Modification (combine, separate, spawn, update).

The Identifier Cross-Reference, for example, maintains UURI to system of record unique identifier to support traceability and search, and provides dereference of each unique identifier to the other.

Search Services 160, for example, provide application logic support to expose the Universal Records Registry 105 to third-party User Interfaces and to support dataset extracts. The Search Services include, for example Search Optimization, Index Creation, Extract Services, and Correlation Engine, described below.

The Search Optimization, for example, is configured to provide more efficient search patterns, including for example, by caching frequently used search results.

The Index Creation, for example, is configured to create and define search indices designed to support searches of metadata and records lifecycle information stored in the Universal Records Registry 105.

The Extract Services is configured to create and prepare the results of search queries as tabular or XML-based datasets for download/offload to other systems in industry standard formats such as CSV. Extracted datasets are useful for third-party analytics and reporting systems. The results may include a report containing a plurality of URR entries (e.g., records), though it should be understood the result may differ depending on the search and system requirements.

The Correlation Engine, for example, is configured to examine existing Registry Entries and Recent Query Criteria and identifies likely corollaries probabilistically between disconnected entries and self-reinforces correlations over time. For example, if a user inputs a search with keywords, "A", "B", "C", and "1998", and another search for "B", "A", "C", and "1990s", they system learns to correlate the terms such that the next search for either group of terms may include UURIs for both instances. These may be run as a background process to work constantly, though potentially at a slower rate, and/or when search/registration demands are minimal to maximize efficiency and limit CPU demand.

According to the embodiment described below, actors in the present system include but are not limited to External Applications A and External User Interfaces B.

External Applications A, for example, are records-involved data systems comprised of partner IT systems, partner IT system components, and third-party IT services utilized by government that create, organize, manage, store, process, disseminate, track, archive or otherwise disposition data that meet the legal definition of "record." The universe of these systems across the federal government numbers in the hundreds of thousands and continues to grow. The External Applications A may take advantage of the RRS 100 search features that are provided to the External User Interfaces B.

An example, non-exhaustive, list of records-involved applications include: (1) Government-wide/Department/Agency/Branch/Center/Office Line of Business Applications (e.g., including financial/budgeting/expenditure/spend/logistics/inventory/operations/reporting systems and data); (2) Government-wide/Department/Agency/Branch/Center/Office Administrative Applications (e.g., including administrative/operational/legal and compliance/reporting systems and data); (3) Government-wide/Department/Agency/Branch/Center/Office Mission-Oriented Applications (e.g., program delivery/program oversight/policy implementation/beneficiary management/beneficiary engagement/objective management/issue management systems and data); (4) Government-wide/Department/Agency/Branch/Center/Office Communication & Collaboration Applications (e.g., email/collaboration platforms/electronic communication applications and data); and (5) Government-wide/Department/Agency/Branch/Center/Office External Communications Streams (e.g., social media channels/press releases/videos/outreach campaigns/citizen engagement systems and data).

Figure 2:
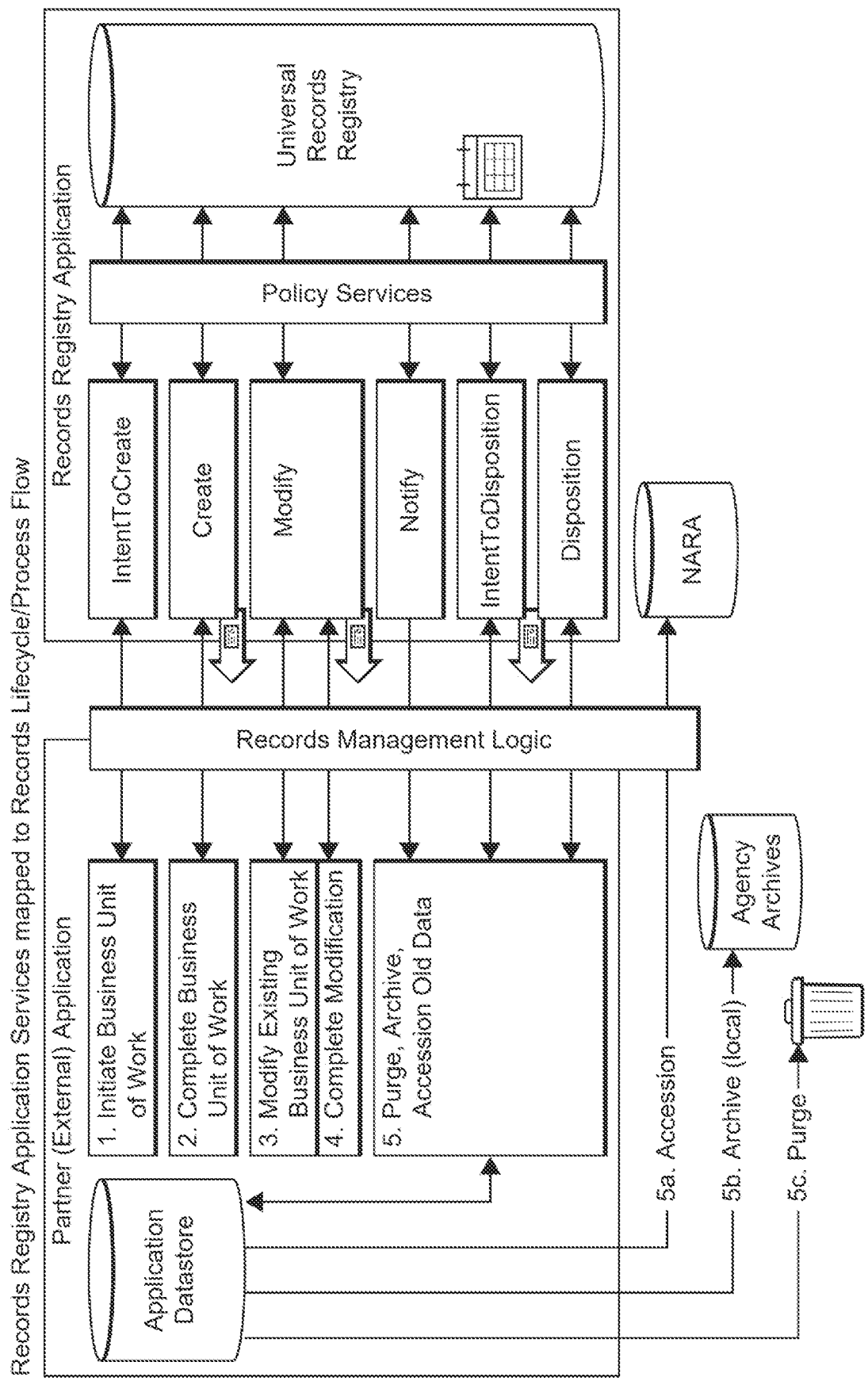
FIG. 2 depicts an exemplary embodiment of the present system including the interaction between a system of the present invention and a partner application.

FIG. 2 depicts an exemplary configuration of the present system including the interaction between a system of the present configuration and a partner application. Further exemplary interactions will be discussed in detail with regard to FIGS. 3-11.

Described below are example use cases of the present system. It is understood that the following examples could be used exclusively or in combination with each other depending on systems requirements and activity.

A first example embodiment according to the present system, described herein as Use Case: A.1, is shown in FIGS. 3-4.

Figure 3:
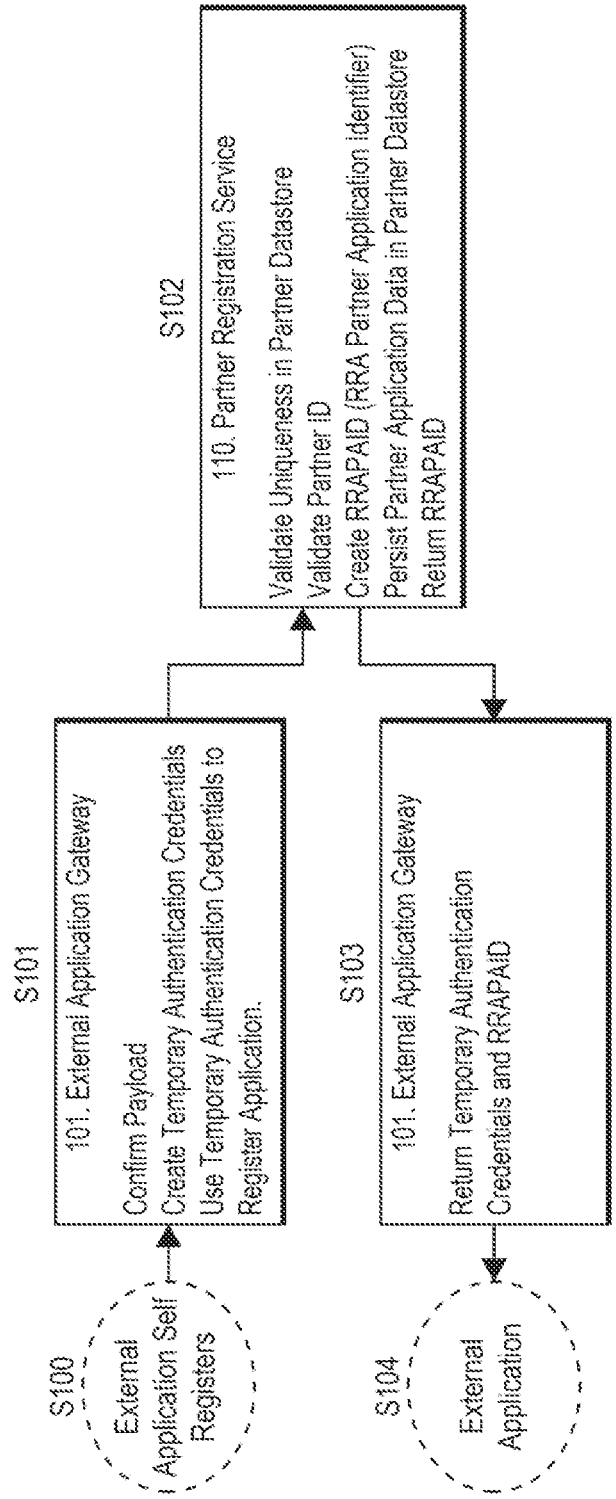
FIG. 3 depicts an exemplary process according to an embodiment of the present system wherein an external application registers itself as "Records-Involved."
Figure 4:
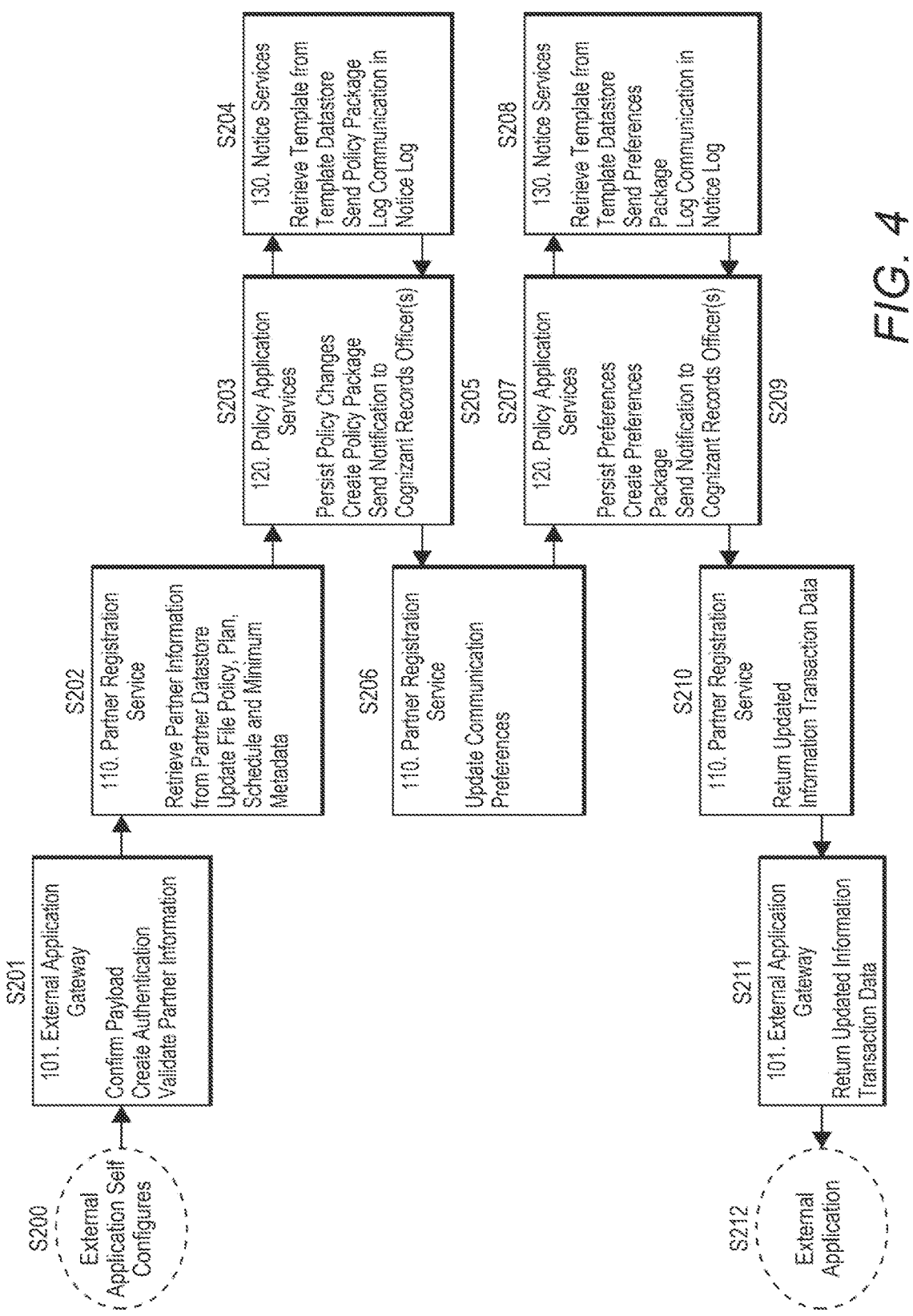
FIG. 4 depicts an exemplary process according to an embodiment of the present system wherein an external application is already registered with the system and is self-configuring.

FIG. 3 depicts a first sequence of the embodiment, Sequence A.1.a, wherein at step S100 an External Application A registers itself as "Records-Involved" with the RRS 100.

In this example, it has been determined via appropriate policy that a software application is records-involved (e.g., participates in the creation, storage, management, tracking, transferring, or tracking of legally defined records) and therefore needs to register with the RRS 100.

In response, at S101 the External Application Gateway 101 confirms the payload (e.g., the substantive content of the communication), creates temporary authentication credentials, and then uses the temporarily created authentication credentials to register External Application A.

This registered application is sent to Partner Registration Services 110 which, at S102, validates the uniqueness in the Partner Datastore, validates a Partner ID, creates a RRA Partner Application Identifier ("RRAPAID"), persists the Partner Application Data in the Partner Datastore, and then returns the RRAPAID to the External Application Gateway 101.

At S103, the External Application Gateway 101 sends the temporary authentication credentials and RRAPAID to the External Application A, which receives that information at S104.

FIG. 4 depicts a second sequence of the embodiment, Sequence A.1.b. In this sequence, the External Application A is already registered (e.g., Partner) with the system and is self-configuring.

At S200 the External Application A self-configures by communicating, for example, its Policy, File Plan, File Schedule, and minimum metadata requirements for appropriate record-types to RSS 100.

At S201 the External Application Gateway 101 confirms the payload, confirms the authentication, and validates the partner information.

At S202 the Partner Registration Services 110 retrieves the partner information from the Partner Data store and updates the configuration settings, e.g., such as updating the file policy, plan, schedule, and minimum metadata.

At S203 the Policy Application Services 120 persists the policy changes and creates a policy package.

At S204 the Notices Services 130 retrieves a template from the Template Datastore, sends the policy package, and logs the communication in the Notice Log.

At S205 the Policy Application Services 120 sends the notification to the Cognizant Records Officer(s) (e.g., responsible person, party, and/or program for managing the External Application's record(s)), e.g., External Application A.

At S206 the Partner Registration Services 110 updates communication preferences.

The Policy Application Services 120 at S207 then persists the updated communication preferences and creates a preference package.

At S208 the Notice Services 130 retrieves a template from the Template Datastore, sends the preference package, and then logs the communication in the Notice Log.

At S209 the Policy Application Services 120 sends the notification to the Cognizant Records Officer[s].

At S210 the Partner Registration Service 110 returns the updated information and transaction data.

At S211 the External Application Gatew 101 returns the updated information and transaction data to the External Application A, which receives that information at S212.

The External Application A and Cognizant Records Officer receives confirmation of updated configuration elements. Then, the policy changes take effect after an elapsed repudiation period. It should be understood that only certain portions of this sequence may be necessary depending on the configuration changes.

The External Application A is fully configured as an RRS Partner Application and will receive automated support to operate in a manner compliant with configured policy and legal mandates, to support other records transactions, and to provide public visibility into Records created, managed, stored, modified, or dispositioned by the application.

Figure 5:
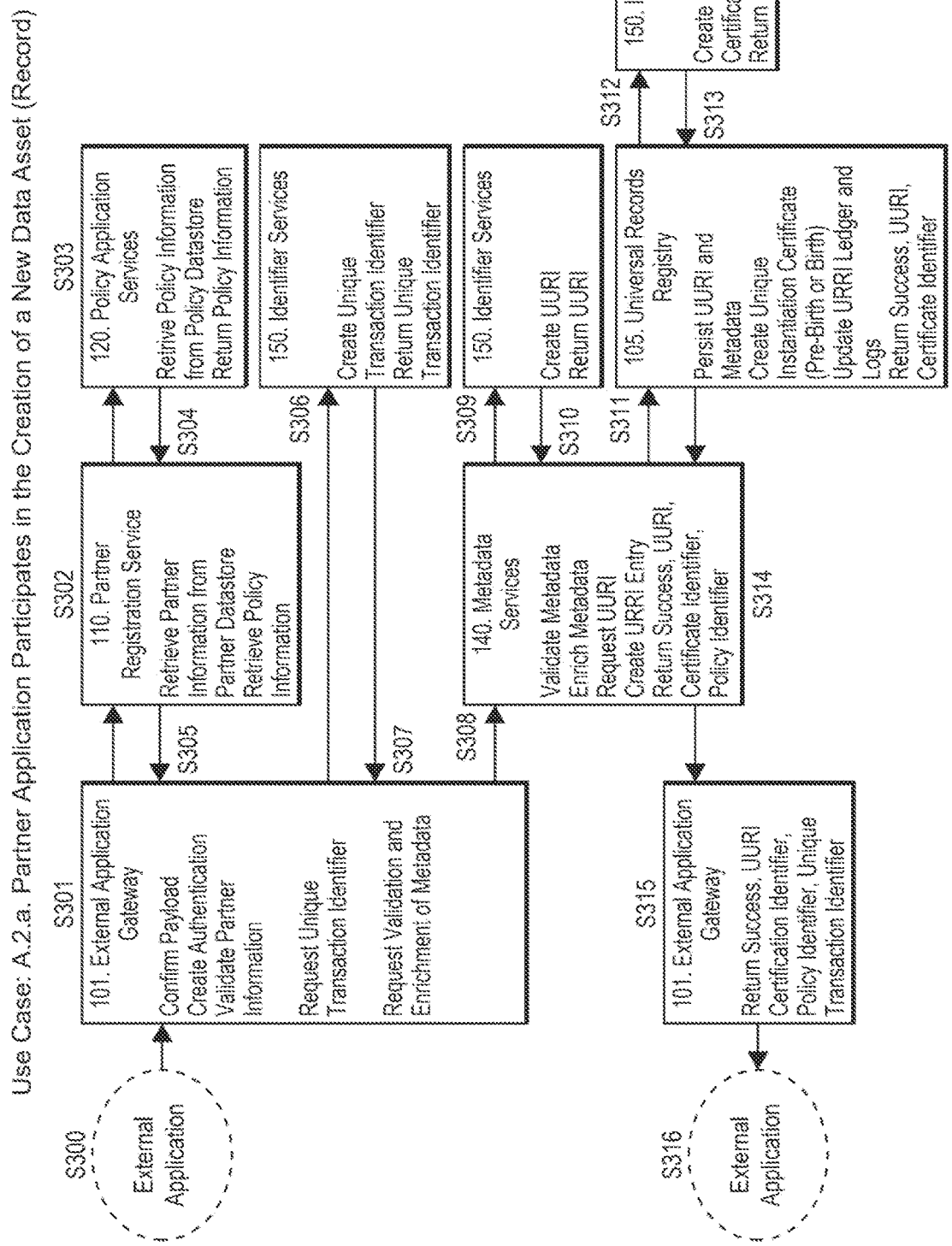
FIG. 5 depicts an exemplary process according to an embodiment of the present system wherein an external application participates in the creation of a new record.
Figure 6:
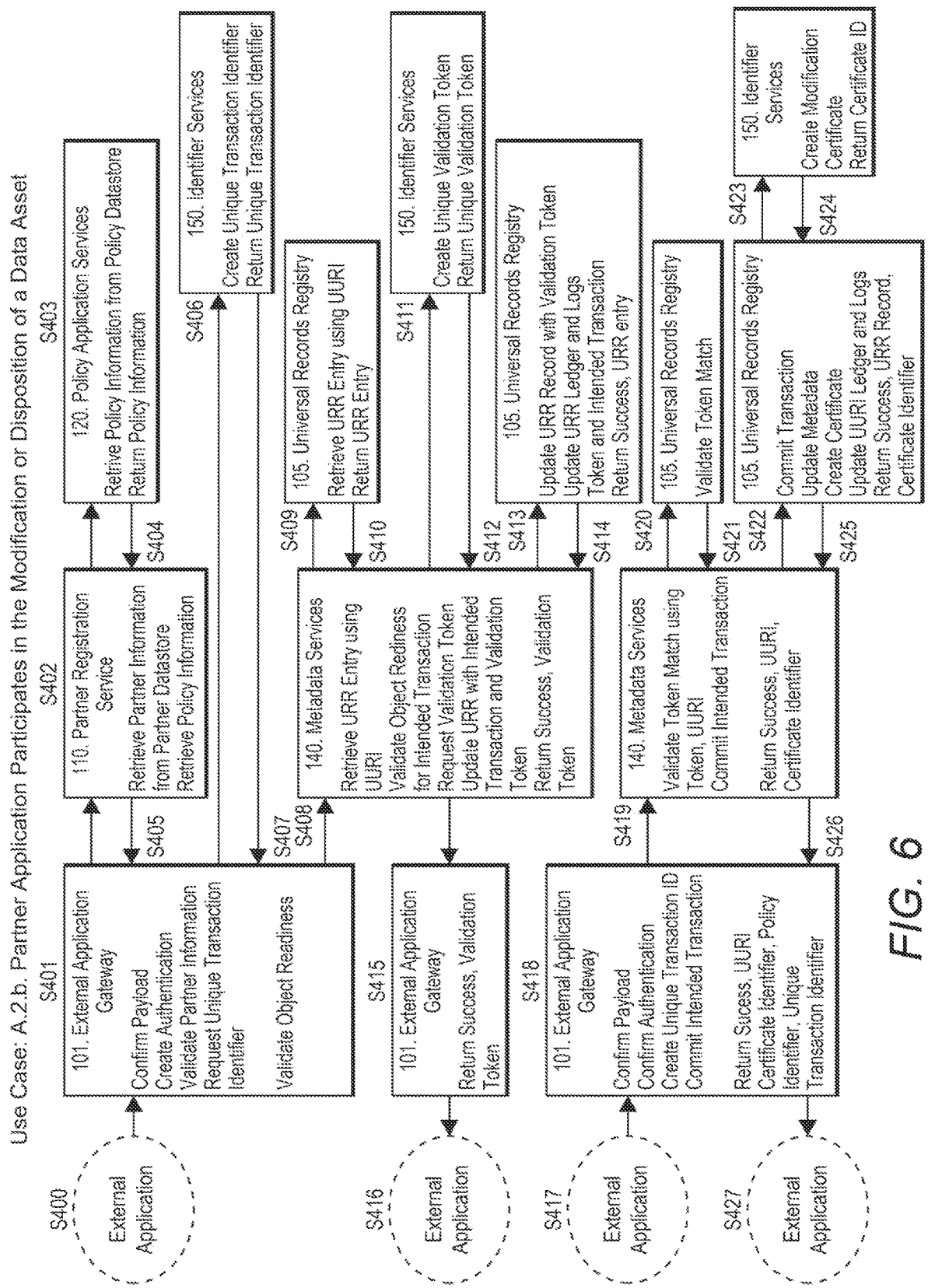
FIG. 6 depicts an exemplary process according to an embodiment of the present system wherein an external application participates in the modification or disposition of an existing record.
Figure 7:
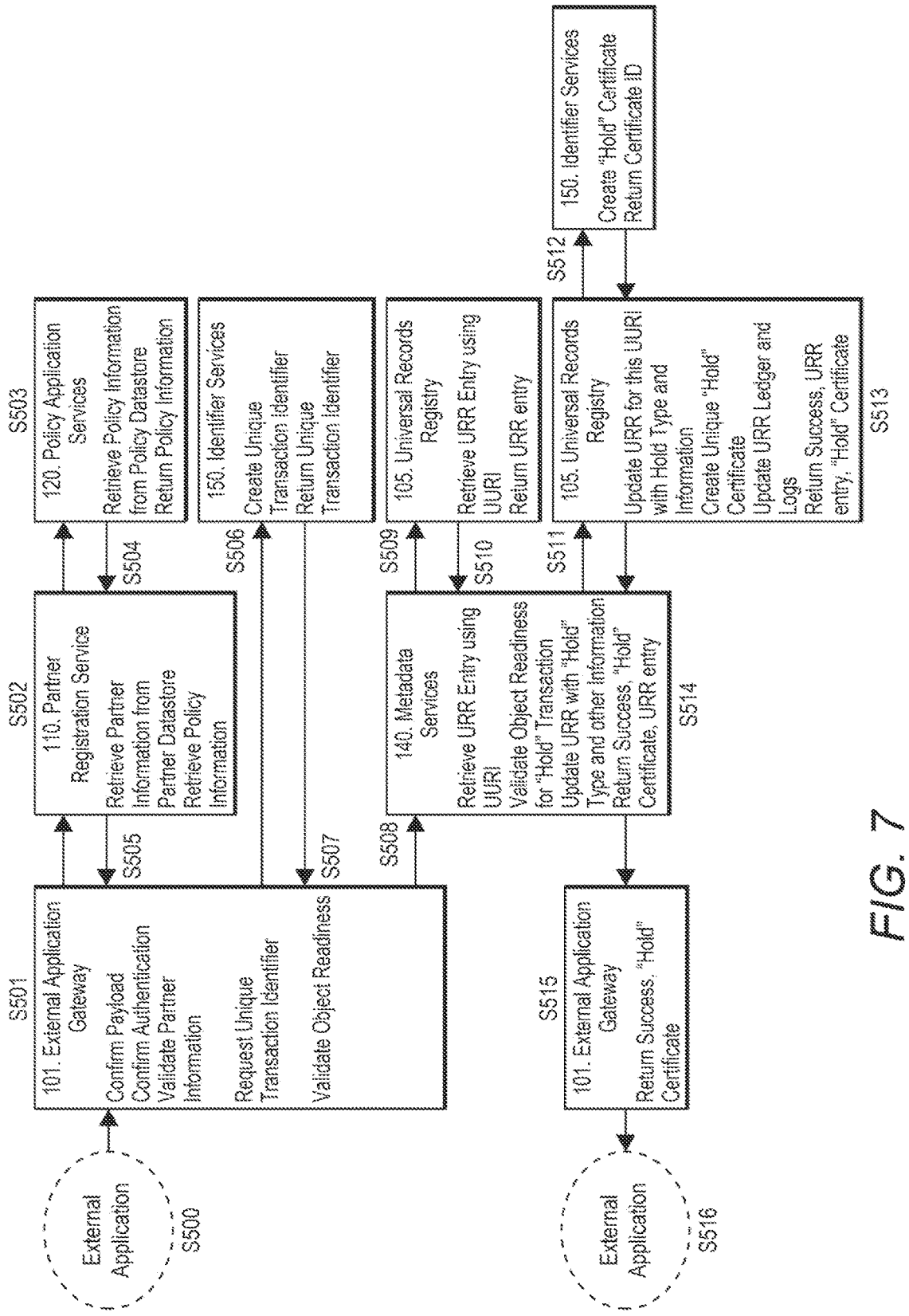
FIG. 7 depicts an exemplary process according to an embodiment of the present system wherein an external application requests that certain records be placed on "Hold" to temporarily prevent dispositioning or status changes.

A second example embodiment addressing changes to Records according to the present system, described herein as Use Case: A.2, is depicted in FIGS. 5-7. FIG. 8 depicts a table including exemplary types of record changes, the usage thereof, the related activity by the Partner Application, and the RRS 100 response.

FIG. 5 depicts a first sequence of the embodiment, Sequence A.2.a. In this sequence, the Partner Application participates in the creation of a new data asset (e.g., new record). Through normal operations, the External Application A has completed internal processing that conforms to a records trigger event (e.g., Create, Modify, Change State, Change Policy, Disposition, etc. as shown in FIG. 8) that meets the criteria to be a government Record and notifies the RRS 100 of the event and submits mandatory metadata describing the Record that was instantiated. The RRS 100 then creates a universally unique record identifier (UURI) for this record (e.g., Identifier Services 150) and logs the entry with an appropriate status in the Universal Records Registry 105. The RRS 100 determines appropriate plan/policy indicator (or uses override value from partner application). The RRS 100 then validates required metadata presence and configuration-based edits. The RRS 100 enhances or enriches metadata (described above) and commits the information to the RRS 100 in the Universal Records Registry 105. The RRS 100 responds to the initiating Partner Application with a success/failure notification and appropriate messages to include the record's universally unique record identifier (UURI) and the corresponding file/policy mapping, and a "birth" certificate transaction ID that uniquely identify the instantiation of this record.

More specifically, at S300 External Application A notifies the RRS 100 of a process requiring a Record to be created to the RSS 100. It should be understood throughout that External Application A and Partner Application may be used interchangeably in certain circumstances.

At S301, the External Application Gateway 101 confirms the payload, confirms the authentication, and validates the partner information.

At S302 the Partner Registration Service 110 retrieves the partner information from the Partner Datastore.

At S303 the Policy Application Services 120 retrieves policy information from the Policy Datastore and returns the policy information.

At S304, the Partner Registration Service 110 retrieves the policy information.

At S305 the External Application Gateway 101 requests a Unique Transaction Identifier.

At S306 the Identifier Services 150 creates and then returns a unique transaction identifier.

At S307 the External Application Gateway 101 requests validation and enrichment of the metadata and requests creation of a UURI.

At S308 the Metadata Services 140 validates and enriches the metadata and requests a UURI which the Identifier Services 150 creates and returns at S309.

At S310 the Metadata Services 140 creates a UURI Entry. At S311, the Universal Records Registry 105 persists the UURI and metadata, and creates a unique instantiation certificate.

At S312 Identifier Services creates and returns an instantiation certificate.

At S313 the Universal Records Registry 105 updates the UUR ledger and logs, returns a success notification. UURI, and Certificate Identifier. It should be understood throughout these examples that if the process is unsuccessful, then a failure notification will be returned instead of a success notification.

At S314 the Metadata Services 140 returns the success notification, UURI, Certificate Identifier, and policy identifier.

At S315 the External Gateway Application 101 returns the success notification, UURI, Certificate Identifier, policy identifier, and unique transaction identifier which are received by the External Application A at S316.

FIG. 6 depicts a second sequence of the embodiment, Sequence A.2.b. In this sequence, the Partner Application participates in the modification or disposition of a data asset (e.g., record) that has been previously registered with RRS 100. The Partner Application notifies RRS 100 of the occurring transaction. The RRS 100 determines the proposed transaction is valid (e.g., are there holds or retention schedules that would make it inappropriate to change the state of this record). If valid, the RRS 100 provides a "validated token" to the Partner Application containing the proposed transaction and an expiration period for its use (as per configuration policy). When the Partner Application is ready, it represents the "validation token" to the RRS 100 to commit the proposed record transaction. The RRS 100 creates a ledger of changes, updates baseline and enriched metadata, as appropriate, assigns unique change transaction codes, and updates the Universal Records Registry 105 with new statuses and a historical log of the proposed transaction. The RRS 100 responds to the initiating Partner Application with success/failure and appropriate messages to include the record's universally unique record identifier and the corresponding file/policy mapping, and a "modified" or "disposition" certificate transaction ID that uniquely identify the update to this record.

At S400 the External Application A notifies RRS 100 of an occurring transaction which requires modification or disposition of a record. In this example, the Partner Application is obtaining a validation of a pending transaction or batch of transactions before the transaction is completed.

At S401 the External Application Gateway 101 confirms the payload, confirms the authentication, and validates the partner information.

At S402 the Partner Registration Service 110 retrieves the partner information from the Partner Datastore. Then, at S403 the Policy Application Services 120 retrieves and returns the policy information from the Policy Datastore.

At S404 the Partner Registration Service 110 retrieves the policy information which is sent to the External Application Gateway 101 at S405 and requests a unique transaction identifier.

At S406 the Identifier Services 150 creates a unique transaction identifier and returns a unique transaction identifier to the External Application Gateway 101.

At S407 the External Application Gateway 101 receives the unique transaction identifier and validates object readiness.

At S408 the Metadata Services 140 requests the URR entry using the UURI, which is retrieved and returned by the Universal Records Registry at S409.

At S410 the Metadata Services 140 retrieves the UUR entry using the UURI, validates the object readiness for an intended transaction (e.g., modification or disposition of record or set of records), and requests creation of a validation token which is created and retuned by the Identifier Services 150 at S411.

At S412 the Metadata Services 140 updates the URR with the intended transaction and validation token.

At S413 the Universal Records registry 105 updates the URR record with validation the token, updates the URR ledger, logs the token and intended transaction, and then returns a success notification and URR entry.

At S414 the Metadata Services 140 returns the success notification and validation token. These are received by the External Gateway Application 101 which returns them at S415 and are received by External Application A at S416. The validation token indicates the system "approval" of the transactions and modification.

At S417 the External Application A notifies RRS 100 that the transaction is or has taken place and includes the validation token in the payload of the communication.

At S418 the External Application Gateway 101 confirms the payload, confirms the authentication, and creates a unique transaction identification and commits the intended transaction.

At S419 the Metadata Services 140 validates the match using the token and UURI and commits the intended transaction.

At S420, the Universal Records Registry 105 validates the token match which is received by the Metadata Services 140 at S421.

At S422, the Universal Records Registry 105 commits the transaction, updates the metadata and requests creation of a certification. At S423 the Identifier Services 150 creates a modification certificate and returns the certificate identifier.

At S424 the Universal Records Registry 105 updates the UURI ledger and logs, and then returns a success notification, URR record, and the certificate identifier to the Metadata Services 140.

At S425 the Metadata Services 140 returns the success notification. URRI, and the certificate identifier to the External Application Gateway 101.

At S426 the External Application Gateway 101 returns the success notification, URRI, the certificate identifier, policy identifier, and unique transaction identifier which are received by the External Application A at S427.

FIG. 7 depicts a third sequence of the embodiment, Sequence A.2.c. In this sequence, the External Application A requests that certain records be placed on "Hold" to temporarily prevent dispositioning or status changes such as while legal, e-discovery, or FOIA activities occur that involve these records. The External Application A submits appropriate UURIs and the type of Hold. The RRS 100 determines the proposed transaction is valid and marks the UURIs in the Universal Records Registry as "On Hold" and describes the Hold Reason. The RRS 100 provides "Hold" certificate for each UURI.

After this process is completed, updated, accurate information regarding records lifecycle events are tracked with unique identifiers in the Universal Records Registry 105. Appropriate certificates are also issued representing records lifecycle events.

At S500 External Application A submits appropriate UURIs and the type of Hold to External Application Gateway 101.

At S501 External Application Gateway 101 confirms the payload, confirms the authentication, and validates the partner information.

At S502 the Partner Registration Service 110 retrieves the partner information from the Partner Datastore. Then, at S503 the Policy Application Services 120 retrieves and returns the policy information from the Policy Datastore.

At S504 the Partner Registration Service 110 retrieves the policy information which is received the External Application Gateway 101 at S505 and creates a unique transaction identifier.

At S506 the Identifier Services 150 creates and returns a unique transaction identifier.

At S507 the External Application Gateway 101 validates the object readiness.

Then, at S508 the Metadata Services 140 requests the URR entry using UURI, which is retrieved and returned by the Universal Records Registry at S509.

At S510 the Metadata Services 140 retrieves the UUR entry using the UURI, validates the object readiness for the Hold transaction, and requests and update to the URR with the Hold type and other information.

At S511 the Universal Records Registry 105 updates the URR for this UURI with Hold Type and information and requests a Hold certification with is created and returned by the Identifier Services 150 at S512.

At S513 the Universal Records Registry 105 updates the URR ledger and logs then returns a success notification, URR entry, and Hold certificate to the Metadata Services 140.

At S514 the Metadata Services 140 returns the success notification. URR entry, and the Hold certificate to the External Application Gateway 101.

At S515 the External Application Gateway 101 returns the success notification, URR entry, and the Hold certificate which are received by the External Application A at S516.

Figure 9:
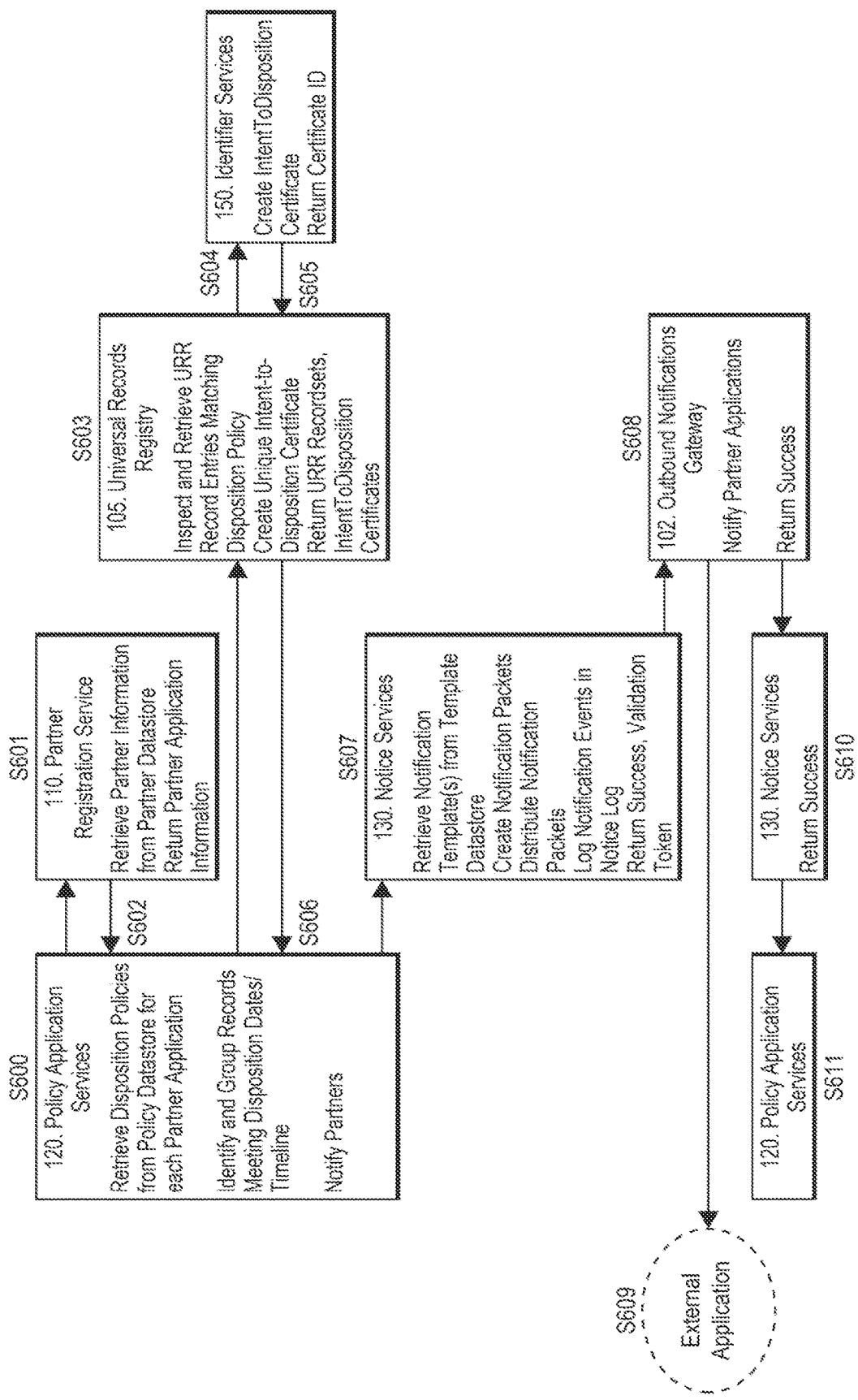
FIG. 9 depicts an exemplary process according to an embodiment of the present system wherein an external application has opted-in to notification event delivery and records tracked by the system have met the criteria for a records status change.

FIG. 9 depicts a sequence of a third embodiment, Sequence A.3. In this sequence, the External Application A has opted-in to notification event delivery and records tracked by RRS 100 have met the criteria for a records status change (e.g., dispositioning time-horizon has been met).

In this sequence, the RRS 100 identifies a number of records that have passed their disposition date associated with Partner Application and are not participating in a "Records Hold." RRS 100 creates a record set of UURIs with associated, policy driven disposition actions, and target dates for consumption by the Partner Application, for example:

i) External Application is notified of the existence of notifications and executes a Pull transaction with RRS, or ii) Partner Application queues are loaded with the notification data, or iii) Partner Applications receive other asynchronous feeds (email, etc.) of records with upcoming distribution events; or iv) RRS logs notifications have been delivered.

As a result of the sequence, External Application A completes disposition actions on identified records (including, as appropriate, deletion/destruction, archival, accessioning).

At S600 the Policy Application Services 120 requests disposition policies from the Policy Datastore for each Partner Application which are retrieved and returned by Partner Registration Services 110 at S601.

At S602 the Policy Application Services 120 identifies and groups records, meeting dispositions, and dates/timelines.

At S603 Universal Records Registry 105 inspects and retrieve the URR, records entries matching the disposition policy, and requests creation of a unique Intent-to-Disposition Certificate which is created by the Identifier Services 150 which returns a certificate identifier at S604.

At S605 Universal Records Registry 105 returns the URR and records/sets the unique Intent-to-Disposition Certificate.

At S606 the Policy Application Services 120 determines to notify the Partner Application.

At S607 the Notice Services 130 retrieve notification template(s) from the template datastore, creates notification packets, distributes notification packets, logs notification events in the notice log, and returns a success notification and validation token.

At S608 Outbound Notification Gateway 102 notifies the Partner Applications which are received at S609 and returns a success notification to the Notice Services 130.

At S610, the Notice Services 130 returns a success notification which is received by the Policy Application Services at S611.

Figure 10:
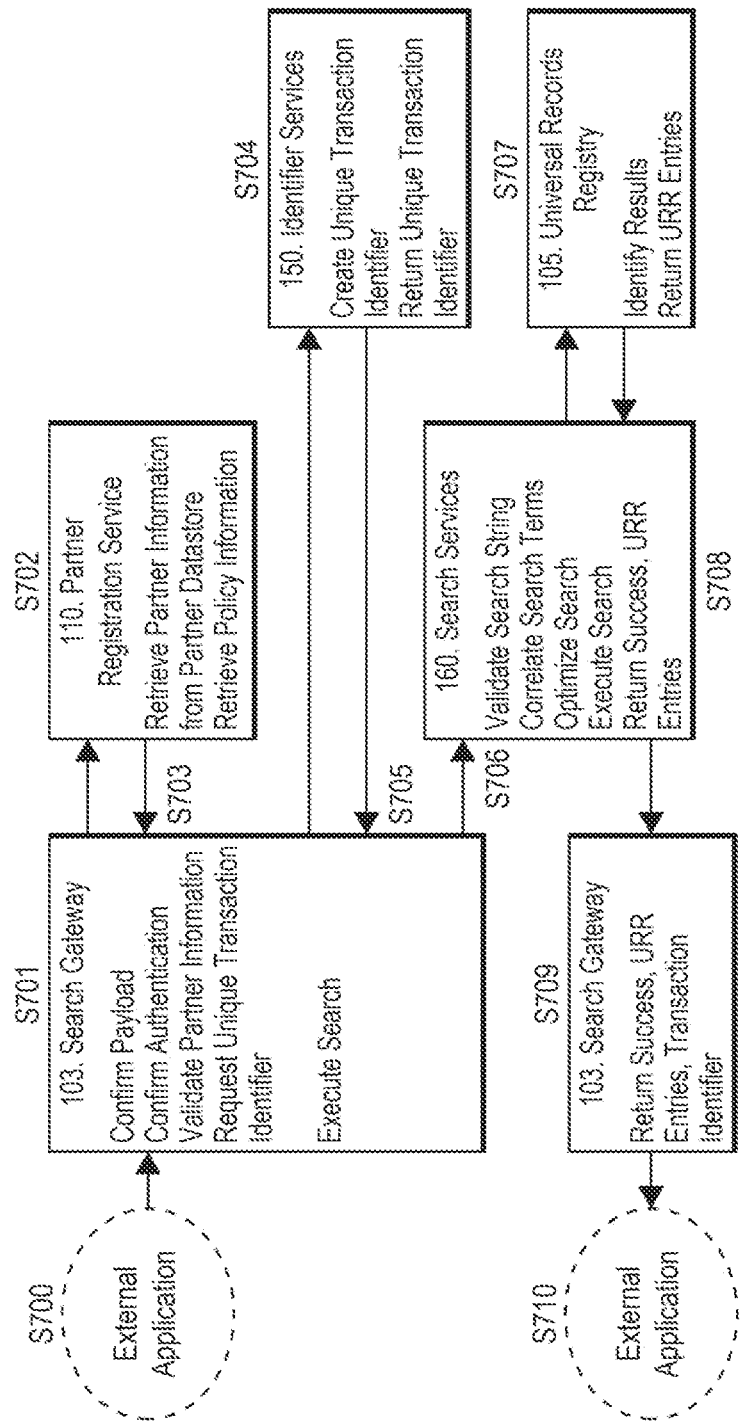
FIG. 10 depicts an exemplary process wherein a search is queried by an External Application.
Figure 11:
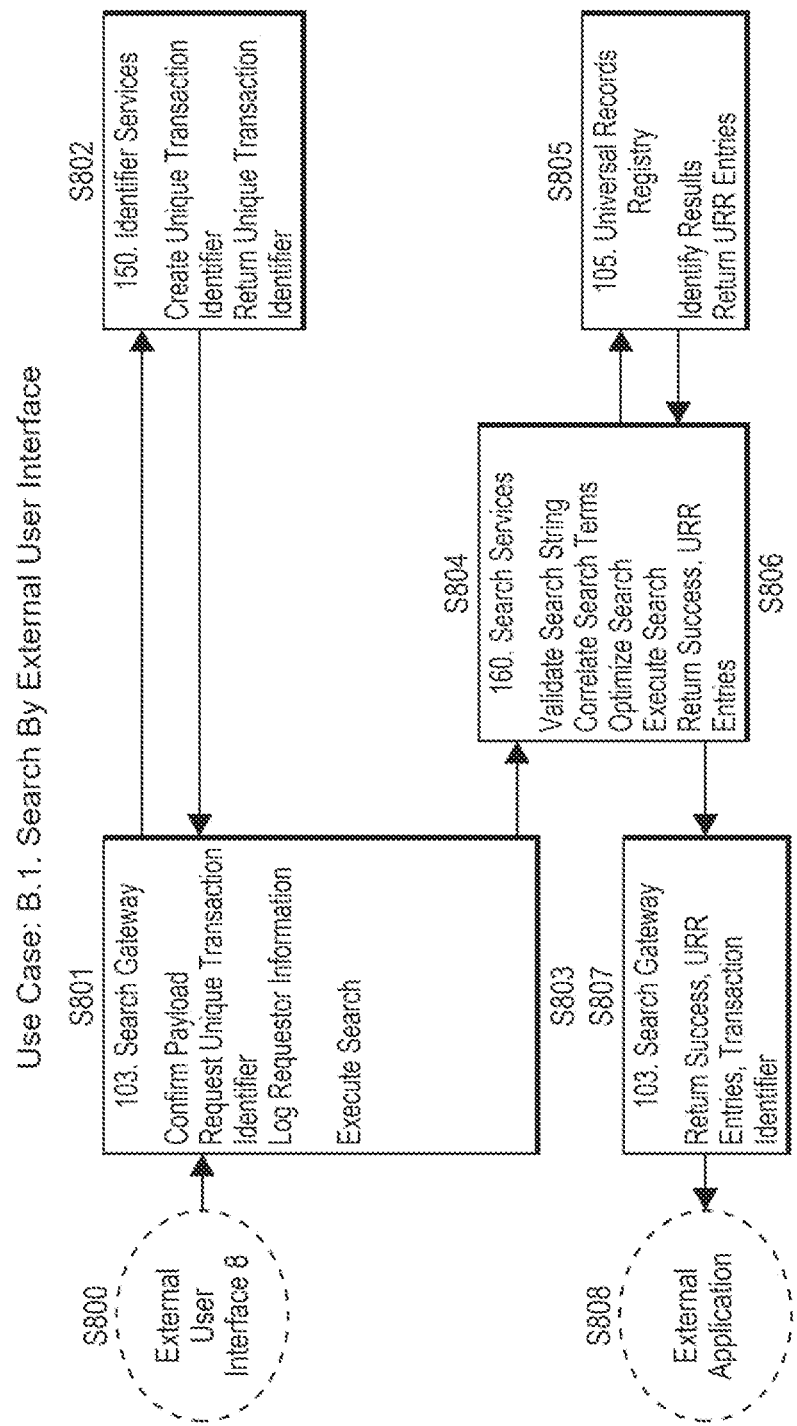
FIG. 11 depicts a sequence wherein a search is queried via external user interface.

FIGS. 10 and 11 depict sequences of another embodiment. In these sequences, Partner Applications and External User Interfaces B participate in a simple query-only interaction following one or more standard search/language patterns (e.g., structured query language (SQL), Regular Expressions (RegEx), or Search Query Language (QUEL)) by accessing public APIs over standard HTTP and other common web protocols.

The Partner Application authenticates with the RRS 100 and is provided with full, context-sensitive results including sensitive information already owned by that application.

External User Interfaces B are not authenticated and are provided with sanitized results, e.g., which remove metadata responses that include sensitive data, PII, PHI or other tags identifying limited access.

External User Interfaces B are third-party applications that consume data provided by the RRS 100 regarding records stored in the Universal Records Registry 105 as managed by components of Search Services 160.

These applications, for example, participate in a simple query-only interaction following one or more standard search/language patterns (e.g., structured query language (SQL), Regular Expressions (RegEx), or Search Query Language (QUEL)) by accessing public APIs over standard HTTP and other common web protocols.

External User Interfaces B include, for example, lightweight, interface-focused applications such as Search-engine search pages, Dashboard queries from management portals, FOIA and e-discovery applications; Data mash-up pages and services; and public interest search portals, etc.

As a result of these sequences, search results are provided as record sets for display.

FIG. 10 depicts a sequence wherein a search is queried by an External Application.

At S700 External Application requests a search.

At S701 the Search Gateway 103 confirms the payload, confirms the authentication, and validates the partner information.

At S702 the Partner Registration Services 110 retrieves and returns the partner information from the Partner Datastore and the policy information.

At S703 the Search Gateway 103 requests a unique transaction identifier which is created and returned by the Identifier Services 150 at S704.

At S705 the Search Gateway 103 requests the search. At S706 the Search Services 160 validates the search string, correlates the search terms, optimizes the search, and then executes the search.

At S707 the Universal Records Registry 105 identifies the results of the search and returns the URR entries. At S708 the Search Services 160 then returns a success notification and the URR entries.

At S709, the Search Gateway 103 returns the success notification, the URR entries, and the transaction identifier to the External Application A which are received at S710.

FIG. 11 depicts a sequence wherein a search is queried via external user interface.

At S800 a search is queried from the External User Interface. At S801 the Search Gateway 103 confirms the payload, logs the requestor information, and requests a unique transaction identifier which is created and returned by the Identifier Services 150 at S802.

At S803 the Search Gateway 103 requests the search. At S804 the Search Services 160 validates the search string, correlates the search terms, optimizes the search, and then executes the search.

At S805 the Universal Records Registry 105 identifies the results of the search and returns the URR entries. At S806 the Search Services 160 then returns a success notification and the URR entries.

At S807, the Search gateway 103 returns the success notification, the URR entries, and the transaction identifier to the External Application A which are received at S808.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc, laser disc, optical disc, digital versatile disc, floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter, e.g., for applications suitable for public and private sectors. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the claims in the non-provisional application claiming priority to this provisional application.

I claim:

1. A universal record registry system comprising a central processing unit configured to:
register an external application comprising partner information and a document policy, wherein the document policy comprises configurations for record creation, modification, and metadata;
obtain a notice of creation or modification of a record from the external application, wherein the record comprises record information;
confirm authenticity of the notice by comparing the partner information to information in the notice;
confirm the record information is consistent with the document policy;
generate a unique transaction identifier for the record;
validate that the metadata associated with the notice is consistent with the document policy;
enrich the metadata if the metadata is not consistent with the document policy; and
create a universally unique record identifier for the record;
wherein the universal record registry system creates the universally unique record identifier regardless of a record file type.

2. The universal record registry system of claim 1, wherein the central processing unit is further configured to:
identify, using a background process executed on the central processing unit, at least one correlation between different search terms included in previous record queries; and
in response to a received record query, present search results based at least in part on the at least one correlation identified using the background process.

3. The universal record registry system of claim 2, wherein the central processing unit is further configured to identify the search results using the received record query and a previously received record query having search terms correlated to one or more search terms of the received record query.

4. The universal record registry system of claim 2, wherein the central processing unit is further configured to reinforce, using the background process, the at least one correlation over time.

5. The universal record registry system of claim 1, wherein the central processing unit is further configured to provide a notification to the external application indicating a readiness of one or more records to be purged or archived based on one or more predefined rules.

6. The universal record registry system of claim 1, wherein the central processing unit is further configured to probabilistically and automatically link stored records.

7. The universal record registry system of claim 1, wherein the central processing unit is further configured to register the external application by:
receiving a communication from the external application indicating the external application is records-involved;
generating, in response to the received communication, a temporary authentication credential for the external application; and
registering the external application using the temporary authentication credential.

8. The universal record registry system of claim 1, wherein the central processing unit is further configured to enrich the metadata using a machine learning and classification algorithm.

9. The universal record registry system of claim 1, wherein the central processing unit is further configured to:
receive a record query via an external user interface, wherein the external user interface is not authenticated; and
provide, in response to the record query, sanitized results with metadata tags associated with sensitive or personal data removed.

10. The universal record registry system of claim 1, wherein the central processing unit is further configured to:
identify records that have passed a disposition date associated with the external application and are not participating in a records hold;
identify notification data comprising a set of universally unique record identifiers for the identified records, associated disposition actions, and target dates for the external application; and
allow the notification data to be received by the external application.

11. The universal record registry system of claim 10, wherein the central processing unit is further configured to allow the notification data to be received by the external application by:
providing a notification to the external application indicating an existence of the notification data and allowing the external application to pull the notification data;
loading the notification data in a queue of the external application; or
providing the notification data to the external application.

12. A method comprising, by a central processing unit:
registering an external application comprising partner information and a document policy, wherein the document policy comprises configurations for record creation, modification, and metadata;
obtaining a notice of creation or modification of a record from the external application, wherein the record comprises record information;
confirming authenticity of the notice by comparing the partner information to information in the notice;
confirming the record information is consistent with the document policy;
generating a unique transaction identifier for the record;
validating that the metadata associated with the notice is consistent with the document policy;
enriching the metadata if the metadata is not consistent with the document policy;
creating a universally unique record identifier for the record, wherein the universally unique record identifier is created regardless of a record file type;
identifying, using a background process executed on the central processing unit, at least one correlation between different search terms included in previous record queries; and
in response to a received record query, presenting search results based at least in part on the at least one correlation identified using the background process.

13. The method of claim 12, further comprising, by the central processing unit, identifying the search results using the received record query and a previously received record query having search terms correlated to one or more search terms of the received record query.

14. The method of claim 12, further comprising, by the central processing unit, reinforcing, using the background process, the at least one correlation over time.

15. The method of claim 12, further comprising, by the central processing unit, providing a notification to the external application indicating a readiness of one or more records to be purged or archived based on one or more predefined rules.

16. The method of claim 12, further comprising, by the central processing unit, probabilistically and automatically linking stored records.

17. The method of claim 12, further comprising, by the central processing unit, registering the external application by:
- receiving a communication from the external application indicating the external application is records-involved;
- generating, in response to the received communication, a temporary authentication credential for the external application; and
- registering the external application using the temporary authentication credential.

18. The method of claim 12, further comprising, by the central processing unit:
- receiving a record query via an external user interface, wherein the external user interface is not authenticated; and
- providing, in response to the record query, sanitized results with metadata tags associated with sensitive or personal data removed.

19. The method of claim 12, further comprising, by the central processing unit:
- identifying records that have passed a disposition date associated with the external application and are not participating in a records hold;
- identifying notification data comprising a set of universally unique record identifiers for the identified records, associated disposition actions, and target dates for the external application; and
- allowing the notification data to be received by the external application.

20. The method of claim 19, further comprising, by the central processing unit, allowing the notification data to be received by the external application by:
- providing a notification to the external application indicating an existence of the notification data and allowing the external application to pull the notification data;
- loading the notification data in a queue of the external application; or
- providing the notification data to the external application.

* * * * *